(12) United States Patent
Tassakos et al.

(10) Patent No.: US 7,012,247 B2
(45) Date of Patent: Mar. 14, 2006

(54) PORTABLE DEVICE FOR MEASURING A POSITION, A SHAPE, AND A SIZE OF AN OBJECT

(75) Inventors: Charalambos Tassakos, Wuerselen (DE); Andreas Demopoulos, Leighton Buzzard (GB)

(73) Assignee: inos Automationssoftware GmbH, Stuttgart (DE)

( * ) Notice: Subject to any disclaimer, the term of this patent is extended or adjusted under 35 U.S.C. 154(b) by 153 days.

(21) Appl. No.: 10/792,704

(22) Filed: Mar. 5, 2004

(65) Prior Publication Data

US 2004/0179206 A1   Sep. 16, 2004

(30) Foreign Application Priority Data

Mar. 14, 2003   (DE) ............................... 103 11 247

(51) Int. Cl.
*G01B 11/03* (2006.01)

(52) U.S. Cl. ..................... 250/239; 702/94; 250/559.29
(58) Field of Classification Search ............. 250/208.1, 250/239, 559.19, 559.29; 356/601, 614, 356/625, 634, 635; 702/94, 95, 104; 901/46, 901/47

See application file for complete search history.

(56) References Cited

U.S. PATENT DOCUMENTS

| 4,567,348 | A | * | 1/1986 | Smith et al. | 219/124.34 |
| 4,849,643 | A | * | 7/1989 | Mundy | 250/559.15 |
| 5,748,505 | A | * | 5/1998 | Greer | 702/104 |
| 6,128,585 | A | * | 10/2000 | Greer | 702/104 |
| 6,323,615 | B1 | * | 11/2001 | Khairallah | 318/568.11 |
| 6,615,112 | B1 | * | 9/2003 | Roos | 700/254 |

* cited by examiner

*Primary Examiner*—Stephone B. Allen
(74) *Attorney, Agent, or Firm*—Paul Vincent

(57) ABSTRACT

The invention concerns a portable device (1) for measuring the position, shape and/or size of an object. The device comprises a carrier element (2), at least one transmission unit for generating and transmitting visible radiation towards the object and at least one receiving unit for receiving the radiation imaging the object. The transmission unit and receiving unit are mounted in a defined position relative to each other on the carrier element (2). Modular construction provides high variability of the device (1) so that it can be used flexibly for various applications. In particular, the transmission unit is mounted to a first holding element (3) and the receiving unit to a second holding element (4), wherein the holding elements (3, 4) can be introduced together with the transmission unit or receiving unit from outside the carrier element (2) to predeterminable mounting positions (5, 6) of the carrier element (2) and be mounted there using mounting means (7, 8) which can be accessed from outside of the carrier element (2).

21 Claims, 3 Drawing Sheets

PORTABLE DEVICE FOR MEASURING A POSITION, A SHAPE, AND A SIZE OF AN OBJECT

This application claims Paris Convention priority of DE 103 11 247.2 filed Mar. 14, 2003 the complete disclosure of which is hereby incorporated by reference.

BACKGROUND OF THE INVENTION

The present invention concerns a portable device for measuring a position, a shape and/or a size of an object. The device has a carrier element, a transmission unit for generating and transmitting visible radiation towards the object and a receiving unit for receiving the radiation imaging the object. The transmission unit and the receiving unit are mounted to the carrier element in a defined position relative to each other.

Portable in the sense of the present invention means that the device is relatively small and can be guided either manually e.g. via a measuring arm, a coordinate measuring machine or by an industrial robot, and introduced to the object to be measured. Measuring arms are distributed e.g. by the company Faro Technologies, Inc., Lake Mary, Fla., USA. Coordinate measuring machines are distributed e.g. by the company Carl Zeiss Industrielle Messtechnik GmbH, 73446 Oberkochen, Del. or by the company Wenzel Präzision GmbH, 97859 Wiesthal, Del. The device may be moved on the coordinate measuring machine either directly by hand or automatically via a motorized position head (e.g. by the company Renishaw, New Mills, Wotton-under-Edge, GB).

The location of an object is defined by its position (x, y, z coordinates) and also its orientation (angle with respect to the x, y, z axis). When the absolute or relative position of the device is known, the position of the object can be determined using the device. The device can also determine the shape and size of the object. The shape and size of the object can be determined with and without knowledge of the exact position of the device. Depending on the design of the device, the position of the object or the size and the shape of the object can be measured in one-dimensional, two-dimensional or three-dimensional space.

When the spatial position of the object to be measured is known, the device of the above-mentioned type can be used to adjust the position of a tool or gripper mounted to the robot arm. Towards this end, the device measures the position of the object, and the position of the tool or gripper is varied until the measured position of the object corresponds with the actual position. A correction matrix can be determined for control of the robot arm in dependence on the actual sizes of that arm.

The transmission unit is designed as a light source, e.g. as a laser and, in particular, as a semi-conductor laser (diode laser). It may also comprise e.g. a white light projector with different fixed and variable patterns. The transmission unit can transmit light in a range which is visible or invisible to the human eye. The receiving unit is designed as an electronic camera with a semi-conductor element of matrix-like construction for video recording, in particular with a CCD (Charged Coupled Device)—or a CMOS (Complementary Metal-Oxide Silicon) chip. A control unit for the transmission unit and an evaluation unit for the receiving unit can either be integrated in the device or be disposed outside of the device.

The transmission unit and the receiving unit are each mounted to the carrier element in a defined position. The position, the shape or the size of the object are measured e.g. using the so-called triangulation method. The laser triangulation method is explained in detail in WO01/69172 (see FIG. 2 thereof), the entire disclosure of which is hereby incorporated by reference. The position, shape and size of the object can be measured e.g. by stereo image processing, by photogrammetric methods or by methods with structured light.

A device of the above-mentioned type is distributed e.g. by the company Perceptron, Inc. 47827 Halyard Drive, Plymouth, Mich. 48170 USA. Such a device and the use of such a device are known e.g. from U.S. Pat. No. 4,645,348 and U.S. Pat. No. 6,166,811. The conventional device comprises a carrier element in the form of a housing which is completely closed except for openings for transmission and receiving unit radiation. The housing has at least one transmission unit formed as a light source which emits radiation visible to the human eye onto the object to be measured. The transmission unit could, however, also transmit invisible UV (ultraviolet) or IR (infrared) radiation. The known device also comprises a receiving unit which receives radiation reflected from the object and converts it into electric signals which are proportional to the intensity of the reflected radiation. The receiving unit comprises e.g. a CCD chip or a CMOS sensor. The receiving unit may comprise conventional camera optics, spectral filters, polarization filters or other filters. The transmission unit and the receiving unit are mounted at predetermined positions in the housing. The housing is then closed and access to the transmission unit and/or the receiving unit from outside the housing is no longer possible.

The device including carrier element, at least one transmission unit and at least one receiving unit is also called a sensor. The transmission unit and the receiving unit each have an optical axis, wherein the optical axes of the two units intersect in a point of intersection at which the object to be measured is disposed. The measuring distance between the device and the object is determined by the inclination of the optical axes relative to each other and by the separation between the transmission and receiving units. The separation between transmission unit and receiving unit determines the length of the device. The known device may have numerous embodiments. The embodiments are designed e.g. for different measuring distances or comprise different transmission units (different frequency, shape, pattern of the emitted light) and/or different receiving units (different optics with different foci, different filters).

This requires production of a plurality of different embodiments of the device for the various applications which makes production of the conventional devices relatively demanding and expensive. The end user must buy and store a plurality of different embodiments of the device for different applications. This results in considerable costs for purchase, storage and maintenance of the conventional devices.

The manufacturers of the conventional devices are obliged (for economic reasons) to keep the range of housing lengths and measuring distances as narrow as possible. For this reason, sensors are available with measuring distances of 400 mm, 500 mm, 600 mm and some other measuring distances determined by the manufacturers. Intermediate sizes are not offered. The conventional devices are therefore not adjusted to the measuring task but vice versa: the measuring conditions must be adjusted to the given technical features of the device, in particular, the measuring distance. Even when the measuring distance must be changed for a subsequent application, the sensor cannot be simply adjusted, rather must be entirely replaced. This results in substantial costs for the end user.

It is the underlying purpose of the present invention to design and further develop a device of the above-mentioned type for measuring an object, wherein the device is highly variable and is flexible with regard to applications having differing requirements. The device should also be as small and compact as possible.

SUMMARY OF THE INVENTION

To achieve this purpose, a device of the above-mentioned type for measuring an object has at least one receiving unit mounted to a holding element, wherein the holding element can be introduced together with the transmission unit and the receiving unit from outside the carrier element to a predeterminable mounting position of the carrier element, the carrier element having a C-shaped cross section at the mounting position.

The inventive device permits measuring of the position (location and orientation), the shape, and the size of an object. These measurements can even be carried out simultaneously. The spatial position of the device must be known to be able to determine the spatial position of an object using the device. Measurement of the shape of an object permits detection of e.g. holes, gaps and edges of an object.

The principal idea of the present invention lies in the modularity and variability of the device and the associated cost reduction. Various holding elements with different transmission units or receiving units mounted thereto are stored. For a particular application, a suitable transmission unit and a suitable receiving unit are selected only when the application requirements are defined, and are introduced in and mounted in the holding element. The transmission units and the receiving units are oriented on the holding elements in a predetermined fashion. Mounting of the holding elements in the carrier element at a predetermined mounting position adjusts the transmission element and the receiving element relative to the carrier element in a defined fashion.

A further advantage is the miniaturization of the device due to particularly compact construction.

The holding elements and the mounting positions of the carrier element are designed to be mutually compatible such that they can be precisely positioned and mounted in the carrier element at the predetermined mounting positions. Different holding elements may be provided for receiving different transmission elements or receiving elements. All of the various holding elements are designed such that they can be positioned and mounted in the carrier element at the predetermined mounting positions.

The carrier element is designed (at least in the region of the mounting positions) such that the holding elements together with the transmission elements and the receiving elements can be introduced into the carrier element without a demanding opening or dismantling of the carrier element, and such that the transmission elements and the receiving elements can be contacted electrically for signal communication. The mounting means for fixing the holding elements in the carrier element can be accessed from the outside such that the holding elements can be quickly and easily mounted to the carrier element. The mounting means are e.g. screws which are screwed into associated threaded holes of the holding element through openings in the carrier element.

The carrier element may be made from different materials, with mechanical and thermal stability being the main selection criteria. The length and shape of the carrier element can be easily tailored to the individual requirements of the respective application as can other parameters of the inventive measuring device. The holding elements may also be produced from different materials. They may be made e.g. from a metal block which is shaped in a computer-controlled CNC (computer numerical control) milling machine. This permits particularly precise manufacture of the holding elements. The electric connecting lines for power supply and/or signal transmission of the transmission and receiving elements project through corresponding openings, laterally or on the rear side of the holding elements. Suitable recesses in the carrier element permit guiding of the connecting lines out of the device. Standardized plug connections can connect the connecting lines of the transmission and receiving elements in the carrier element or passed outside the device to connecting lines communicating with a control device and/or power supply.

In accordance with the present invention, suitable holding elements are selected from a predetermined group of holding elements for different transmission elements and receiving elements in association with a given application (for a given measuring distance, given resolution, given frequency of the transmitted radiation and/or for a given pattern of the transmitted radiation on the object etc.) and introduced and mounted in a corresponding mounting position of the carrier element.

In an advantageous further development of the present invention, the holding elements and the mounting positions of the carrier element have matching support surfaces such that the holding elements introduced at the mounting positions of the carrier element abut with their full surface on the carrier element. This allows the holding elements to be positioned on the carrier element with particular precision.

In a preferred embodiment of the invention, the support surfaces are flat. In this embodiment, the transmission element and the receiving element are mounted to the holding elements, positioned together therewith in two-dimensional space, and fixed at a desired position relative to the carrier element. The holding element can be fixed on the support element, e.g. by screwing a screw from the outside through a threaded opening of the carrier element, the screw having a distal end supported on the holding element to clamp it in the desired position.

Alternatively, the support surfaces of the holding elements may be spherical and the support surfaces of the mounting positions of the carrier element may be dome-shaped. In this alternative embodiment, the holding elements may be positioned in three-dimensional space together with the transmission or receiving element mounted thereto and be fixed in a desired position relative to the carrier element.

Another advantageous further development of the present invention suggests modular construction of the device and provision of different first holding elements for receiving different transmission units and different second holding elements for receiving different receiving units, wherein a first holding element selected in dependence on the requirements for measuring the position and/or size of the object, with a given transmission unit, and a second holding element, selected in dependence on the requirements for measuring the position and/or size of the object with a given receiving unit, are mounted to the carrier element.

A further preferred embodiment of the invention suggests forming the carrier element as a profile with a C-shaped cross-section. In a carrier element formed in this fashion, the holding elements can be introduced from the open side between the two opposite legs of the profile and be fastened there. Such a C-shaped profile also has very high stability such that the position of a transmission element mounted in the carrier element can be kept constant with high precision relative to a receiving element which is also mounted in the carrier element. Finally, such a C-shaped profile can be produced in a relatively easy and inexpensive fashion. The carrier element can be cut out from sheet metal selected according to the application requirements (e.g. steel or aluminium) e.g. using a laser beam with high precision and at little cost. The use of this flat raw material permits use of special temperature-resistant metals which are available at acceptable costs only as flat sheet metal, rod or pipe.

Finally, the shape is defined with high precision and at little cost using CNC machines, i.e. bent to produce the C-shaped cross-section. Finally, the carrier element can be cut to the desired length. In this fashion, different carrier elements with different sizes, in particular with different length, depth and material thickness can be produced in a rapid, flexible and inexpensive fashion.

Alternatively, the carrier element is formed as a tubular profile. In a carrier element of this design, openings are provided in the region of the mounting positions for introducing the holding elements.

In another preferred further development of the invention, the materials of the carrier element and at least one holding element are selected such that the material of the carrier element has a smaller linear expansion coefficient than the material of the at least one holding element. The linear expansion coefficient is a measure of the linear extension of a material when the temperature changes. Brass, aluminum and steel have the following linear expansion coefficient a values, stated in the literature:

$$\alpha_{brass}=(18.3\pm0.4)\times10^{-6}\,K^{-1}$$

$$\alpha_{aluminum}=(23.6\pm0.2)\times10^{-6}\,K^{-1}$$

$$\alpha_{steel}=(11.3\pm0.2)\times10^{-6}\,K^{-1}$$

The carrier element is advantageously produced from steel. Steel is a very good compromise with regard to temperature stability, rigidity and price. The carrier element may be produced from particularly temperature-stable materials, e.g. so-called INVAR metal alloys. The at least one holding element is preferably produced from aluminium. The relatively soft aluminium permits highly precise, simple machining of the holding elements from an initial geometrical shape (e.g. cuboid, cubic, spherical, ellipsoid, etc.) and to relatively small size.

In a further preferred embodiment of the invention, mounting means, disposed on the carrier element, fix at least one of the holding elements with lateral offset with respect to an optical axis of the transmission unit or the receiving unit, wherein the mounting means are disposed on a side of the optical axis which is opposite to the other holding element. The carrier element is usually longer than the holding elements. The length change of the carrier element (larger length but reduced linear expansion coefficient) due to temperature change is approximately equal to the length change of the holding element (shorter length but larger linear expansion coefficient). Lateral mounting of the holding element with the transmission or receiving element, offset relative to the optical axis of that element, on the side of the optical axis opposite to the other holding element having the other receiving or transmission element causes the longitudinal extensions of the carrier and the holding elements to be opposite to each other such that they are largely mutually compensated for. This embodiment provides a simple and at the same time particularly effective temperature compensation such that temperature changes hardly effect the measurement accuracy of the device.

Large independence in the measuring accuracy of the device on temperature changes can be obtained when the carrier element is produced from a metal alloy with a particularly small linear expansion coefficient. Such metal alloys include i.a. INVAR. These materials are available at acceptable prices, in the form of sheet metal, pipes or rods.

The device according to the invention is characterized in that the holding elements completely surround the transmission unit or the receiving unit except for openings in the holding elements for passage of the radiation. A holding element is either cubical or spherical and contains a transmission element or a receiving element. The radiation produced by the transmission element can be directed, via an opening in the holding element, towards the object of measurement or the radiation reflected by the object of measurement can gain optical access to the receiving element. The outer surfaces of the holding element are supported (preferably with their full surfaces) on the corresponding support surfaces at the mounting positions of the carrier element.

A tubular protection element can preferably be mounted on the second holding element to surround a receiving unit optics in a radial direction and having an opening in the axial direction for the radiation reflected by the object. The protection element which is mounted to the second holding element has the same axial length as the receiving unit optics. This protection element protects the receiving element optics in a radial direction with respect to mechanical damage, soiling and moisture. The protection element can be screwed onto the second holding element e.g. by a thread. Alternatively, it can be screwed to the holding element using suitable screws.

The openings of the holding elements or the tubular protection element can be covered by movable cover flaps to also protect the transmission element and the receiving element in the holding element from mechanical damage, soiling and moisture in an axial direction. The optics of the transmission element or receiving element can be protected in particular from possible welding splashes. Prior to welding, the cover flaps are moved in front of the openings of the holding elements or the tubular protection element and are subsequently removed from the openings to measure the components to be welded or which are already welded.

The cover flaps can advantageously be pivoted into and out of the optical path. A pivot axis or pivot motion of the cover flaps preferably extends parallel to an optical axis of the transmission or receiving unit. The cover flaps are preferably moved by electromotors. Electromotors are particularly advantageous due to their compact size and the same power source (electricity rather than gas or liquid) can be used as for the other sensor elements. A pneumatic or hydraulic drive of the cover flaps is also feasible, in particular when the flaps are larger.

The cover flaps are preferably in front of the transmission element or receiving element in the resting position to provide permanent protection of both elements without having to inform a central control unit about the welding times during which the optical elements must be protected. Only when a central control requests measuring of the object, are the cover flaps actively moved out of the optical axes of the two elements for the duration of the measurement. When the cover flaps have an electrical drive, no current flows to the drive motors prior to measurement of the object. In the current-less state, the cover flaps are held in the resting position in front of the transmission element or receiving element, e.g. by spring elements.

Further features, possible applications and advantages of the invention can be extracted from the following description of embodiments of the invention shown in the drawing. The features described or shown are important to the invention individually or in arbitrary combination irrespective of combinations thereof in the claims or their dependencies and irrespective of their formulation or representation in the description and drawing.

DESCRIPTION OF THE PREFERRED EMBODIMENT

Figure 1:
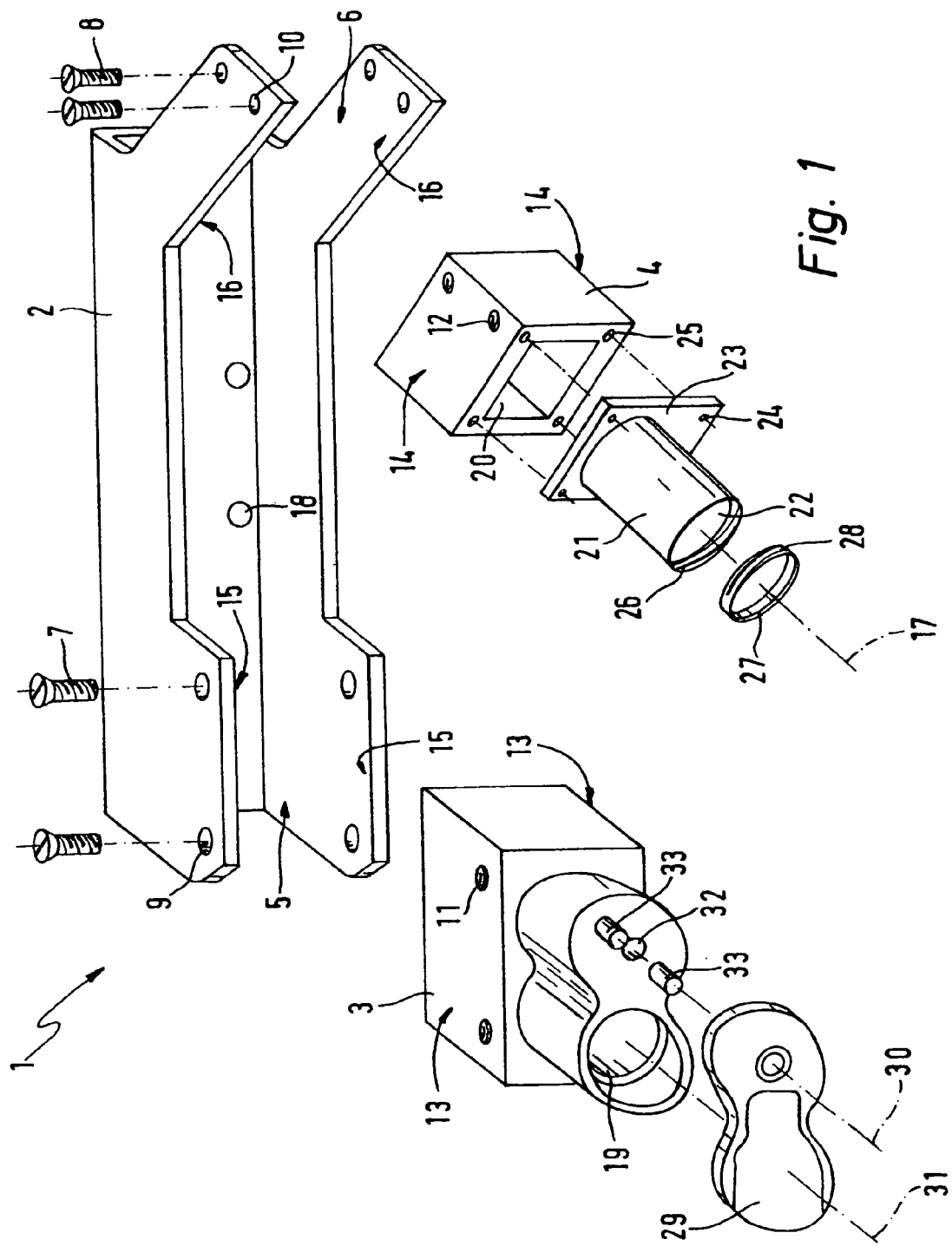
FIG. 1 shows a perspective view of an inventive device for detecting a position and/or size of an object in accordance with a first preferred embodiment.

FIG. 1 shows an embodiment of the inventive portable device for measuring the position and/or size of an object, referred to in its entirety with 1. In the embodiment of FIG. 1, the device 1 has a carrier element 2 and a first holding element 3 for a transmission unit and a second holding element 4 for a receiving unit. Portable in the sense of the invention means that the device 1 is relatively small and can be guided either manually, e.g. via a measuring arm (distributed by the company Faro Technologies, Inc., Lake Mary, Fla., USA) or by an industrial robot. Towards this end, the device 1 is mounted via suitable openings 18 in the carrier element 2 to the distal end of the measuring arm or a robot arm of the industrial robot.

The transmission unit produces and transmits visible radiation towards the object to be measured. The receiving unit receives the radiation imaging the object. The radiation used to measure the object may be visible to the human eye. Radiation which is invisible to the human eye (ultraviolet (UV)—or infrared (IR) radiation) may be used which is, however, detected by the receiving unit. The transmission unit is e.g. a laser. The receiving unit is e.g. a digital camera and preferably comprises a CCD (charged coupled device) or a CMOS (complementary metal-oxide silicon) sensor.

In an alternative preferred embodiment for stereo measurement, the first holding element 3 houses a second receiving unit or camera. For such applications, an additional external light source can be advantageously mounted to the carrier element 2, the first holding element 3 and/or the second holding element 4.

Figure 2:
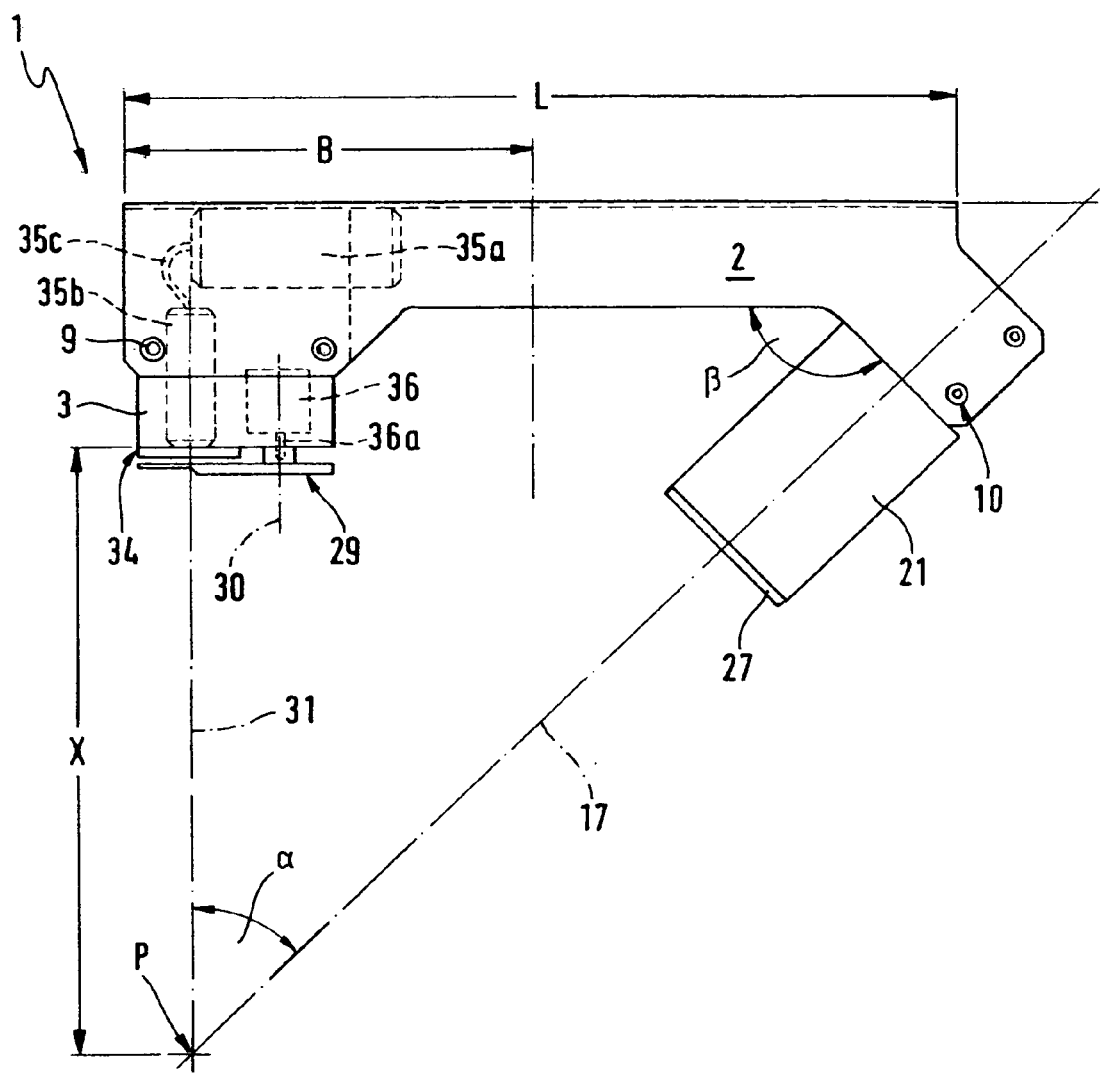
FIG. 2 shows a top view onto the inventive device of FIG. 1.

The transmission unit and the receiving unit are mounted on the carrier element 2 in a defined position relative to each other via the holding elements 3, 4 (see FIG. 2). The inventive device 1 utilizes the so-called triangulation method. The laser triangulation method is explained in detail in WO01/69172 (see FIG. 2 of this publication the entire disclosure of which his hereby incorporated by reference). However, this device can also be used for stereo image processing and/or with image processing methods having structured light. For stereo image processing, at least two receiving units must be mounted to the carrier element. Measurement of an object using structured light requires a corresponding transmission unit which must not necessarily be mounted to the carrier element.

The holding elements 3, 4 can be introduced together with the transmission unit or receiving unit from outside the carrier element 2 to predeterminable mounting positions 5, 6 of the carrier element 2. In the mounting positions 5, 6, the holding elements 3, 4 are mounted using mounting means 7, 8 which can be accessed from outside the carrier element 2. The mounting means 7, 8 are e.g. screws which are guided through openings 9, 10 in the carrier element 2 and are screwed into corresponding threaded holes 11, 12 in the holding elements 3, 4 such that the external threads of the screws 7,8 thereby engage the inner threads of the threaded openings 11, 12. In FIG. 1, the screws 7, 8 are slotted head screws. The screws 7, 8 are precision screws which ensure, together with the conical holes 11, 12 of the carrier element 2, a highly precise connecting position between carrier element 2 and holding elements 3, 4. The screws 7, 8 can, of course, also be recessed head screws, hexagon socket screws or hexagon head screws. The openings 9, 10 may also be threaded openings with an inner thread with which the screws 7, 8 engage, wherein the threaded openings 11, 12 can be omitted such that the distal ends of the screws 7, 8 clamp the holding elements 3, 4 in the carrier element 2 at the mounting positions 5, 6.

The holding elements 3, 4 and the mounting positions 5, 6 of the carrier element 2 have mutually adapted support surfaces 13, 14, 15, 16 such that the holding elements 3, 4 introduced to the mounting positions 5, 6 of the carrier element 2 abut with their full surface on the carrier element 2. The holding elements can thereby be positioned with high precision relative to the carrier element 2. In FIG. 1, the support surfaces 13, 14, 15, 16 are flat. This permits motion of the holding elements 3, 4 at the mounting positions 5, 6 relative to the carrier element 2 in two dimensions. Alternatively, the support surfaces 13, 14 of the holding elements 3, 4 may be spherical and the support surfaces 15, 16 of the mounting positions 5, 6 of the carrier element 2 may be dome-shaped. This would permit motion of the holding elements 3,4 in the mounting positions 5, 6 relative to the carrier element 2 in three-dimensional space. In a desired position, the holding elements 3, 4 could then be fixed in the mounting positions 5, 6. The holding element 4 is designed such that it can be rotated through 90° about the optical axis 17 together with the receiving unit. This may be required since the format of the transmission unit disposed in the holding element 3 is not square, but adapted to the typically different resolutions for lines and columns of the CCD or CMOS sensor chip.

The present invention is particularly advantageous in that the device 1 has a modular construction and can be variably used. In particular, different first holding elements 3 are provided for receiving different transmission units and different second holding elements 4 are provided for receiving different receiving units. The outer size of the holding elements 3, 4 is standardized such that holding elements 3, 4 for different transmission units or receiving units can all be inserted into and fixed in the mounting positions 5, 6. Depending on the requirements for detecting the position and/or the size of the object, a first holding element 3 with a given transmission unit and a second holding element 4 with a given receiving unit are selected. The selected holding elements 3, 4 can be mounted to the carrier element 2 quickly and with little effort to permit easy adjustment of the device to different requirements.

The carrier element 2 has a U-shaped cross-sectional profile. The profile is bent from appropriately shaped metal sheet, which can be laser cut. The carrier element 2 may alternatively be formed with a tubular profile. The materials from which the carrier element 2 and the holding elements 3, 4 are made are selected such that the material of the carrier element 2 has a smaller linear expansion coefficient than the material of the holding elements 3, 4. The carrier element 2 is preferably produced from steel and the holding elements 3, 4 from aluminium. Alternatively, the carrier element 2 may be produced from a metal alloy with a particularly small linear expansion coefficient distributed e.g. INVAR.

The second holding element 4 is mounted to the carrier element 2 by means of the mounting means 8 which, viewed from above, are disposed with lateral offset with respect to an optical axis 17 of the receiving unit. The mounting means 8 are disposed on a side of the optical axis 17 opposite to the first holding element 3. A temperature change produces a longitudinal extension of the carrier element 2 (small linear expansion coefficient but large length) and an approximately equal longitudinal extension of the holding element 4 (larger linear expansion coefficient but shorter length). The longitudinal extension of the holding element 4 is directed opposite to that of the longitudinal extension of the carrier element 2 such that the two longitudinal extensions are approximately compensated for.

The holding elements 3, 4 completely surround the transmission unit or the receiving unit except for openings 19, 20 in the holding elements 3, 4 for passage of the radiation. The holding elements 3, 4 shown in the drawing are square or cuboid. Alternatively, the holding elements 3, 4 may also be rotational bodies, e.g. cylindrical or spherical.

A tubular protection element 21 may be mounted to the second holding element 4, which surrounds a receiving unit optics in a radial direction and has an axial opening 22 for the radiation reflected by the object. The protection element 21 mounted to the second holding element 4 has at least the same axial length as the receiving unit optics. The protection element 21 is substantially hollow, cylindrical and has a collar 23 with openings 24 disposed on the end facing the holding element 4. The protection element 21 is screwed to the second holding element 4 via the openings 24 and the threaded holes 25 in the holding element 4. The inner wall of the protection element 21 has an inner thread 26 in the region of the opening 22. Conventional optical filters 27 can be screwed with their outer thread into the inner thread 26.

The opening 19 of the first holding element 3 can be covered by a movable cover flap 29. Alternatively or additionally, the opening 20 of the second holding element 4 and/or the opening 22 of the protection element 21 may also be covered by a cover flap. The cover flap 29 can be pivoted about a pivot axis 30 into and out of the path of rays. The pivot axis 30 of the pivot motion of the cover flap 29 extends parallel to an optical axis 31 of the transmission unit. In order to move the cover flap 29, an electromotor (not shown) is disposed in the holding element 3 and has a motor axis projecting from the holding element 3 through an opening 32 in the region of the pivot axis 30 and is mounted to the cover flap 29. Alternatively, electromagnets or piezo devices may be used to pivot the cover flap 29.

The protection element 21 protects the receiving unit in a radial direction from mechanical damage, soiling and moisture. The cover flap 29 can protect the transmission unit from soiling or moisture from an axial direction e.g. welding splashes, when the object to be measured is welded between the measurements with device 1.

Two circular segment-shaped guiding grooves are provided on the side of the cover flap 29 facing the holding element 3 which engage two cylindrical guiding pins 33 on the side of the holding element 3 facing the cover flap 29. The cooperation between the guiding grooves and the guiding pins permits limitation of the pivot motion of the cover flap to a predetermined range.

FIG. 2 shows a top view onto the device 1 of FIG. 1. Identical components have identical reference numerals. The object to be measured is disposed in a point of intersection P of the optical axis 31 of the transmission unit and the optical axis 17 of the receiving unit. The two optical axes 17, 31 intersect at an angle $\alpha=45°$. The front side of the second holding element 4 is disposed at an angle of $\beta=180°-\alpha=135°$ relative to a longitudinal extension of the carrier element 2. L is the length of the carrier element 2 in the longitudinal direction. The separation between the front side of the first holding element 3 and the object to be measured is X. B is the separation between the end of the carrier element 2 associated with the first holding element 3 and the center between the two openings 18 to which a measuring arm or a robot arm is mounted to the carrier element 2.

A protection filter 34 is disposed in front of the opening 19 of the first holding element 3. It has an outer thread (as does the filter 27), via which the filter 34 is mounted to an inner thread formed in the opening 19.

FIG. 2 shows the transmission unit inside the first holding element 3 with dashed lines which in total is designated with reference numeral 35. The transmission unit 35 is formed in two parts to save space, wherein the two parts 35a, 35b are connected to each other via a connecting cable 35c. The electromotor inside the first holding element 3 for driving the cover flap 29 is shown with dashed lines in FIG. 2 and referred to in total with reference numeral 36. The motor axis 36a of the electromotor 36 is mounted to the cover flap 29 in the region of the pivot axis 30.

Figure 3:
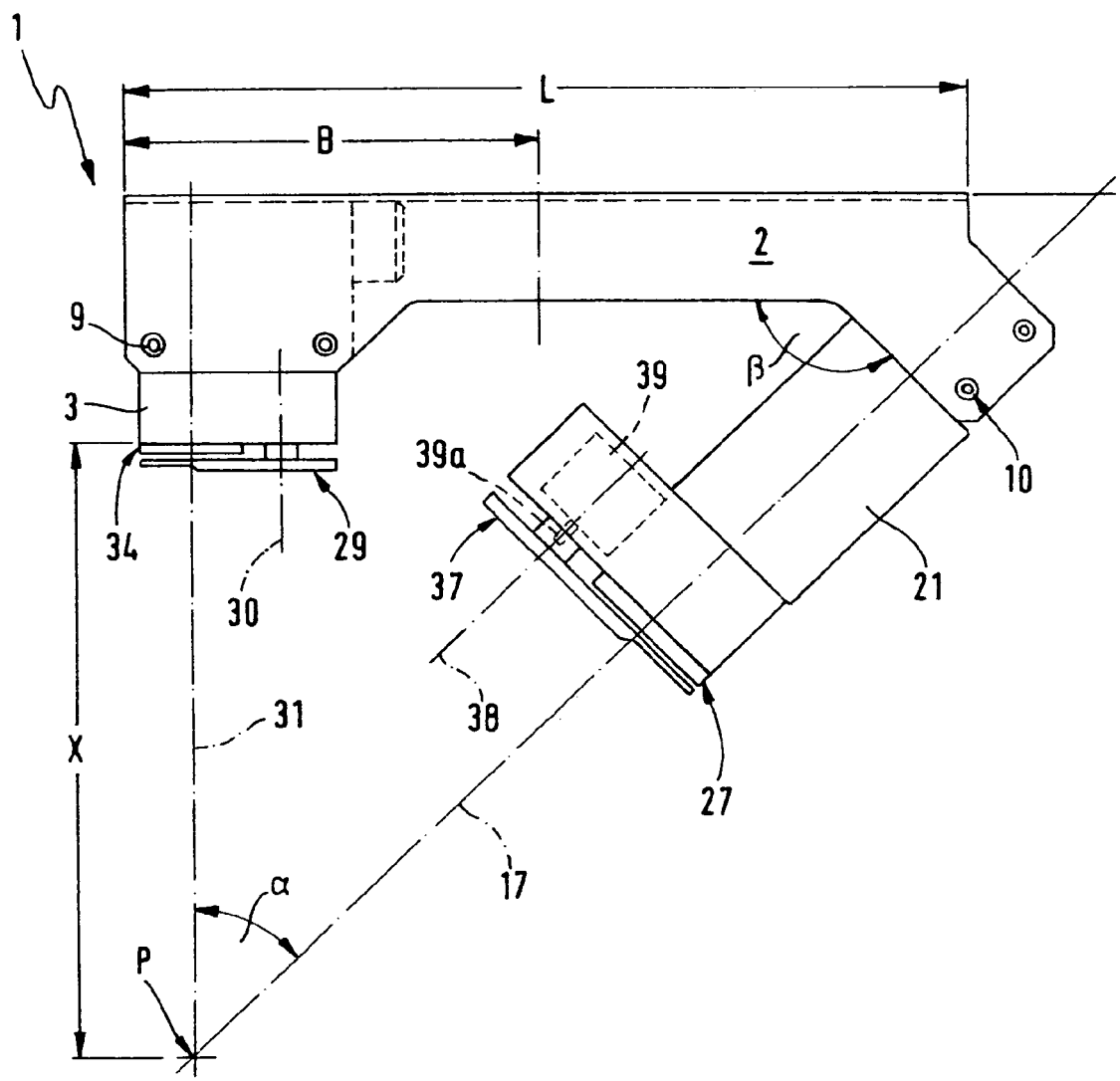
FIG. 3 shows a top view onto an inventive device for measuring the position and/or size of an object in accordance with a second preferred embodiment.

FIG. 3 shows a top view onto a second embodiment of the inventive device 1. The device 1 of FIG. 3 differs from the device 1 of FIGS. 1 and 2 in particular in that a further cover flap 37 is provided not only in front of the opening 19 of the first holding element 3, but also in front of the opening 20 of the second holding element 4, more precisely, in front of the opening 22 of the cylindrical protection element 21. The cover flap 37 can be pivoted about a pivot axis 38. The pivot motion is generated by an electromotor 39 which cooperates with the cover flap 37 via a motor shaft 39a. The projection comprising the cover flap 37 and electromotor 39 can be mounted to the protection element 21 through mounting means designed e.g. as screws.

The invention proposes a device 1 which provides a maximum degree of variability due to its modular construction. The inventive device 1 can be easily adjusted to the most different requirements. Transmission elements and receiving elements can be replaced in a simple and rapid fashion. Despite the modular construction, the inventive device 1 can meet the highest requirements with regard to measuring accuracy as is made possible, in particular, by the specific design of the mounting positions 5, 6 of the carrier element 2 and the support surfaces 13, 14 of the holding elements 3, 4. The inventive device 1 preferably uses standard components which are combined and matched in a particularly advantageous fashion. Conventional optical components of the so-called C-mount category can e.g. be used in the embodiment shown in the drawing.

We claim:

1. A portable device for measuring a position, a shape and/or size of an object, the device comprising:
   a carrier element;
   a first holding element mounted to said carrier element at a first predetermined mounting position; and
   at least one first receiving unit for receiving visible radiation imaging the object, said first receiving unit mounted to said first holding element, wherein said first holding element is structured for mounting to said carrier element together with said first receiving unit and wherein said carrier element has a C-shaped cross section proximate said first mounting position.

2. The device of claim 1, further comprising a second holding element mounted to said carrier element at a second predetermined mounting position spaced apart from said first mounting position, and also further comprising an optical unit for either transmitting or receiving visible radiation to or from the object, said optical unit mounted to said second holding element.

3. The device of claim 2, wherein said optical unit comprises a transmission unit for generating and transmitting visible radiation towards the object.

4. The device of claim 2, wherein said optical unit comprises a second receiving unit for receiving visible radiation imaging the object.

5. The device of claim 1, further comprising mounting means, accessible from outside said carrier element, for mounting said first holding element to said carrier element.

6. The device of claim 1, wherein said first holding element and said first mounting position of said carrier element have corresponding support surfaces such that said first holding element abuts with full surface on said carrier element when mounted at said first mounting position.

7. The device of claim 6, wherein said support surfaces are flat.

8. The device of claim 6, wherein a support surface of said first holding element is spherical and a support surface of said first mounting position of said carrier element is dome-shaped.

9. The device of claim 2, wherein the device has a modular construction and further comprising a plurality of differing second holding elements for receiving differing optical units and a plurality of differing first holding elements for receiving differing first receiving units, wherein said second holding element is selected in dependence on requirements for measuring a position and/or size of the object with a given optical unit and said first holding element is selected in dependence on requirements for measuring the position and/or size of the object with a given first receiving unit.

10. The device of claim 1, wherein said carrier element is formed as a tubular profile.

11. The device of claim 2, wherein materials of said carrier element and of at least one of said first and said second holding elements are selected such that material of said carrier element has a smaller linear expansion coefficient than material of at least one of said first and said second holding elements.

12. The device of claim 11, wherein said carrier element is produced from steel.

13. The device of claim 11, wherein at least one of said first and said second holding elements is produced from aluminium.

14. The device of claim 11, wherein at least one of said first and said second holding elements is mounted to said carrier element using mounting means which are disposed with lateral offset with respect to an optical axis of said optical unit or said first receiving unit, wherein said mounting means are disposed on a side of said optical axis opposite to an other of said first or said second holding element.

15. The device of claim 1, wherein said carrier element is produced from a metal alloy with a particularly small linear expansion coefficient.

16. The device of claim 2, wherein each of said first and said second holding elements completely surround said first receiving unit and said optical unit, respectively, except for openings in said first and said second holding elements for passage of radiation.

17. The device of claim 1, further comprising a tubular protection element mounted to said first holding element to radially surround said receiving unit, said protection element having an opening in an axial direction for passage of radiation reflected by the object, wherein said protection element, mounted to said first holding element, has at least a same axial length as said receiving unit.

18. The device of claim 2, further comprising a first moveable flap for covering an opening in said first holding element and a second moveable flap for covering an opening in said second holding element.

19. The device of claim 18, wherein said first and said second flaps can be pivoted into and out of a path of radiation.

20. The device of claim 19, wherein pivot axes of pivot motions of said first and said second cover flaps extend parallel to a respective optical axis of said first receiving unit and said optical unit.

21. The device of claim 18, further comprising electromotors for moving said first and said second cover flaps.

* * * * *